United States Patent Office 3,663,460
Patented May 16, 1972

3,663,460
CHROMIUM(III) AND IRON(III) HYDROXY BIS(PHOSPHINATE) AND BIS(ARSINATE) POLYMERS
Burton Peter Block, Wayne, Piero Luigi Nannelli, King of Prussia, Hyman David Gillman, Norristown, and Paula Marion Thomas, King of Prussia, Pa., assignors to Pennwalt Corporation, Philadelphia, Pa.
No Drawing. Filed Apr. 27, 1970, Ser. No. 32,351
Int. Cl. C08g 33/16, 33/20
U.S. Cl. 260—2 P
6 Claims

ABSTRACT OF THE DISCLOSURE

Chromium(III) and iron(III) hydroxy bis(phosphinate) and bis(arsinate) polymers composed of the recurring unit [Z(OH)(OMRR'O)$_2$], where Z is chromium or iron in the trivalent state, M is phosphorus or arsenic, and R and R' are inert organic groups, are useful as corrosion proof coatings for metal which will be subjected to high temperature conditions.

---

This invention relates to a new class of inorganic polymers that are composed of the repeating unit having the formula [Z(OH)(OMRR'O)$_2$], where Z is chromium or iron in the trivalent state, M is phosphorus or arsenic, and R and R' are inert organic groups, which may be the same or different, such as alkyl, aryl, alkoxy or aryloxy, preferably hydrocarbon alkyl or aryl groups containing from 1 to 10 carbon atoms. The molecular weights of the polymers embodied herein generally will range from about 2000 to about 100,000, and can be as high as about 300,000.

U.S. Pat. No. 3,275,574, issued Sept. 27, 1966, Anthony J. Saraceno, describes and claims certain coordination polymers which are completely inorganic in their backbone and have unexpectedly high temperature stability. Among the polymers described in the patent are hydroxyaquo metal phosphinate and arsinate polymers. U.S. Pat. No. 3,444,103, May 13, 1969, Keith Dean Maguire, describes an improvement over the method disclosed by Saraceno for preparing said hydroxyaquo metal phosphinate and arsinate polymers.

It has now been discovered that the new class of anhydrous inorganic polymers having improved properties claimed herein can be prepared by dehydrating hydroxyaquo polymers (described in the foregoing patents) composed of the repeating unit [Z(H$_2$O)(OH)(OMRR'O)$_2$] where Z, M, R and R' are as defined previously. The dehydration is desirably accomplished by heating the precursor hydroxyaquo polymer at sub-atmospheric pressure, e.g., preferably less than about 0.02 p.s.i.a., and at from about 50° C. to about 200° C., although the dehydration can be carried out at these temperatures at atmospheric pressure. However, in the case of preparing the iron-containing polymers, the reduced pressure dehydration can be carried out at room temperature without heating. An alternative method of dehydration is that of extractive and azeotropic distillation using benzene or toluene as the azeotropic solvent.

The anhydrous inorganic polymers of the invention are especially useful for providing adherent, corrosion proof coatings to metals, which coatings can withstand high temperature service, for example, ranging from 200° C. to about 400° C. The coatings are applied to the metal by conventional dipping or spraying techniques, and dried at room temperature or with heating, from solvent solutions in chloroform, benzene, toluene, tetrahydrofuran, or the like. Minor proportions of plasticizer, for example, up to about 25 parts per 100 parts by weight of the inorganic polymer, may be added to the polymer solution to provide more flexible coatings. Suitable plasticizers include, for example, tricresyl phosphate, dialkyl phthalates, and chlorinated aromatics.

Coatings prepared from the polymers of this invention are surprisingly very superior in quality to those prepared in a similar manner from their hydroxyaquo polymer precursors, for instance, with regard to greater adhesion and better appearance. Coatings of the hydroxyaquo polymers have a cracked and brittle appearance and will peel from the metal surface, in contrast to the tenaciously adherent and smooth surfaced-coatings of the anhydrous polymer.

The following examples illustrate and clarify the present invention.

EXAMPLE 1

An inorganic hydroxyaquo polymer composed of the repeating unit [Cr(H$_2$O)(OH)(OP(C$_6$H$_5$)$_2$O)$_2$] having an intrinsic viscosity in chloroform solution at 30° C. of 0.05 dl./g. is prepared by the method of Maguire, U.S. 3,444,103. Five grams of this polymer is heated under vacuum at 200° C. for about three hours. The resulting anhydrous polymer weighs 4.83 g. The infrared spectrum indicates that the coordinated water has been completely removed. The polymer is soluble in chloroform, benzene, and tetrahydrofuran. The intrinsic viscosity of fresh solutions in chloroform is 0.12 dl./g. which increases to about 1.0 dl./g. on standing at 55° C. for a few days.

Analysis.—Calculated for C$_{24}$H$_{21}$CrO$_5$P$_2$ (percent): C, 57.26; H, 4.20; Cr, 10.33; P, 12.31. Found (percent): C, 57.30; H, 4.37; Cr, 9.92; P, 12.69, confirming the structure of the polymer product of the repeating unit [Cr(OH)(OP(C$_6$H$_5$)$_2$O)$_2$]. A coating composition is prepared by dissolving 5.6 parts by weight of this anhydrous polymer and 1.4 parts tricresyl phosphate in 150 parts chloroform. Cold-rolled steel plates are dipped in the solution, removed and drained dry, and dipped again until a polymer coating 1.5 mils thick is formed thereon. The coating, which is dried at room temperature for 24 hours, has a smooth, flawless surface. Cross-hatched areas of the coating pass the standard "Scotch Tape test" indicating good adhesion of the polymer to the metal.

Similar steel plates are coated with the precursor hydroxyaquo polymer of the repeating unit

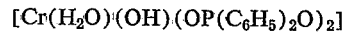

described earlier in this example, using exactly the techniques employed above in applying coatings of the anhydrous polymer. The surfaces of these latter coatings are extensively cracked and fail the "Scotch Tape" adhesion test.

EXAMPLE 2

Following the procedure of Example 1, 3 g. of the polymer composed of the unit

is converted to 2.87 g. of the anhydrous hydroxy polymer composed of the repeating unit

Analysis.—Calculated for C$_{14}$H$_{17}$CrO$_5$P$_2$ (percent): C, 44.34; H, 4.52; Cr, 13.71; P, 16.33. Found (percent): C, 44.13; H, 4.77; Cr, 13.30; P, 16.56.

EXAMPLE 3

A 5.6 g. sample of polymer composed of the repeating unit [Cr(H$_2$O)(OH)(OP(C$_6$H$_5$)$_2$O)$_2$] and having an intrinsic viscosity in chloroform of 0.05 dl./g. at 30° C. is dissolved in about 150 ml. of benzene. The solvent is then distilled off slowly until the volume of the reaction mixture is reduced to about 60 ml. Fresh benzene is then added to restore the original volume. Distillation is resumed and continued to dryness by heating with an oil bath at 120° C. The residual benzene is then removed by heating at 80° C. under vacuum. A quantitative yield of polymer composed of the repeating unit $$[Cr(OH)(OP(C_6H_5)_2O)_2]$$

is obtained. The intrinsic viscosity of fresh chloroform solutions of the polymer is about 0.3 dl./g.

*Analysis.*—Calculated for $C_{24}H_{21}CrO_5P_2$ (percent): C, 57.26; H, 4.20; Cr, 10.33; P, 12.31. Found (percent): C, 57.38; H, 4.56; Cr, 10.10; P, 12.50.

EXAMPLE 4

Subjecting the polymer composed of the repeating unit $$[Cr(H_2O)(OH)(OP(C_6H_5)_2O)(OAs(C_6H_5)_2O)]$$

and having an intrinsic viscosity in chloroform of 0.03 dl./g. at 30° C. to heating at 200° C. for three hours under vacuum yields the anhydrous hydroxy polymer composed of the repeating unit $$[Cr(OH)(OP(C_6H_5)_2O)(OAs(C_6H_5)_2O)]$$

The structure is confirmed by infrared spectral analysis.

EXAMPLE 5

Ferric chloride (1.62 g., 0.01 mole) is dissolved in 50 ml. of water, and this solution is diluted with 60 ml. of tetrahydrofuran. To the resulting solution another solution containing 5.81 g. of $(C_8H_{17})_2P(O)OH$ (0.02 mole) and 1.59 g. of sodium carbonate (0.015 mole) in 60 ml. of water and 30 ml. of tetrahydrofuran is added. A brown precipitate immediately forms. The reaction mixture is boiled for several hours and then filtered. The precipitate is washed with water. After drying under vacuum at room temperature, the yield of product polymer composed of the repeating unit $$[Fe(OH)(OP(C_8H_{17})_2O)_2]$$

is 6.2 g. (95%). The polymer is slightly soluble in chloroform.

*Analysis.*—Calculated for $C_{24}H_{21}CrO_5As_2$ (percent): C, 58.92; H, 10.59; Fe, 8.57; P, 9.50. Found (percent): C, 58.87; H, 10.74; Fe, 8.31; P, 9.37.

EXAMPLE 6

Potassium carbonate (1.036 g., 0.0075 mole) in 40 ml. of water is added to a solution of diphenylarsinic acid (2.621 g., 0.01 mole) in 60 ml. of methanol. The resulting solution is added to a solution of 0.811 g. (0.005 mole) of ferric chloride dissolved in a mixture of 60 ml. of methanol and 40 ml. of tetrahydrofuran. The reaction mixture is boiled to remove the tetrahydrofuran. A polymer precipitates as a fine, brown powder. Drying under vacuum at 50° C. to constant weight gives a quantitative yield of polymer composed of the unit $$[Fe(OH)(OAs(C_6H_5)_2O)_2]$$

It is slightly soluble in chloroform.

*Analysis.*—Calculated for $C_{24}H_{21}CrO_5As_2$ (percent): C, 48.44; H, 3.56; As, 15.19. Found (percent): C, 48.63; H, 3.82; As, 26.51.

We claim:

1. An anhydrous inorganic polymer composed of the repeating units $(Z(OH)(OMRR'O)_2)$ where Z is chromium or iron in the trivalent state, M is phosphorus or arsenic, and R and R' are alkyl, aryl, alkoxy or aryloxy.

2. A polymer in accordance with claim 1 wherein R and R' are each phenyl.

3. A polymer in accordance with claim 1 wherein R and R' are each phenyl, Z is chromium, and M is phosphorus.

4. A polymer in accordance with claim 1 wherein R is methyl, R' is phenyl, Z is chromium and M is phosphorus.

5. A polymer in accordance with claim 1 wherein R and R' are each octyl.

6. A polymer in accordance with claim 5 wherein Z is iron and M is phosphorus.

References Cited

UNITED STATES PATENTS

| | | | |
|---|---|---|---|
| 3,275,574 | 9/1966 | Saraceno | 260—2 P |
| 3,444,103 | 5/1969 | Maguire | 260—2 P |

SAMUEL H. BLECH, Primary Examiner

U.S. Cl. X.R.

117—132 R, 132 B; 260—2 M, 30.4 R, 30.6 R, 31.8 J, 33.6 R, 33.8 R